United States Patent [19]

Hattich et al.

[11] Patent Number: 4,969,952
[45] Date of Patent: Nov. 13, 1990

[54] RELEASE AGENT FOR URETHANE FOAM MOLDING

[75] Inventors: Thomas Hattich; William Krug, both of Heidelberg; Gerhard Schuster, Nuremberg, all of Fed. Rep. of Germany

[73] Assignee: Grace Service Chemicals GmbH, Heidelberg, Fed. Rep. of Germany

[21] Appl. No.: 405,600

[22] Filed: Sep. 11, 1989

Related U.S. Application Data

[63] Continuation of Ser. No. 132,499, Dec. 14, 1987, abandoned.

[30] Foreign Application Priority Data

Dec. 22, 1986 [DE] Fed. Rep. of Germany ....... 3643953

[51] Int. Cl.$^5$ ............................. B28B 7/36; B28B 7/38
[52] U.S. Cl. ............................. 106/38.24; 106/38.25; 106/8; 106/271
[58] Field of Search .................... 106/38.24, 38.25, 8, 106/271

[56] References Cited

U.S. PATENT DOCUMENTS

| | | | |
|---|---|---|---|
| 3,374,100 | 3/1968 | Goldstein | 106/271 |
| 3,406,032 | 10/1968 | Enders | 106/271 |
| 3,518,099 | 6/1970 | Holbus | 106/271 |
| 3,551,168 | 12/1970 | Atherton | 106/8 |
| 3,888,690 | 6/1975 | Geiser | 106/38.24 |
| 3,893,868 | 7/1975 | Klement et al. | 106/38.24 |
| 3,992,502 | 11/1976 | Krishnan | 264/129 |
| 4,609,511 | 9/1986 | Fischer et al. | |
| 4,770,827 | 9/1988 | Fisher | 264/51 |
| 4,783,296 | 11/1988 | Fischer | 264/51 |

FOREIGN PATENT DOCUMENTS

| | | |
|---|---|---|
| 90707 | 10/1983 | European Pat. Off. . |
| 0164501 | 12/1985 | European Pat. Off. . |
| 0188219 | 7/1986 | European Pat. Off. . |
| 131732 | 7/1978 | Fed. Rep. of Germany . |
| 2702930 | 7/1978 | Fed. Rep. of Germany . |
| 3541513 | 5/1987 | Fed. Rep. of Germany . |
| 52-53916 | 4/1977 | Japan . |

OTHER PUBLICATIONS

Noller, C. R., "Chemistry of Organic Compounds" 1965 pp. 252, 258, 259.

Primary Examiner—Mark L. Bell
Assistant Examiner—Deborah Jones
Attorney, Agent, or Firm—James P. Barr

[57] ABSTRACT

A novel aqueous release agent is described, which contains as release-active subtances oil and/or wax emulsified in water as the carrier and which also contains as a further release-active substance one or more aliphatic primary, secondary and/or tertiary amines with at least one $C_{12}$–$C_{24}$ alkyl radical and one or more ammonium salts as the emulsifier for the amine or amines. The invention is based on the surprising finding that hydrophobic amines (so-called fatty amines) are release-active substances. It has also surprisingly been found according to the invention that when using ammonium salts as the emulsifier, mould removal characteristics are not only impaired, but often even improved, which is not the case with conventional emulsifiers. The release agent according to the invention is particularly suitable in processes for producing polyurethane foam articles.

10 Claims, No Drawings

RELEASE AGENT FOR URETHANE FOAM MOLDING

This is a continuation of application Ser. No. 132,499, filed Dec. 14, 1987, now abandoned.

BACKGROUND OF THE INVENTION

The invention relates to an aqueous release agent, which as release-active substances contains oil and/or wax emulsified in water as the carrier, as well as the use thereof.

Polyurethane foam articles are produced in moulds and this can take place according to the most varied prior art processes. A large number of variants, which are known to those skilled in the art, are possible with respect to the foam-forming components used and with respect to the equipment and moulds used. Generally the mould is filled in the open or closed state through a feed channel with the polyol and isocyanate components mixed by means of a mixing head. Apart from the sought product and its desired characteristics, the composition of the components is also decided by whether working is to take place according to the single-stage process (direct process) or the two-stage process (prepolymer or semi-prepolymer process). All these different possible procedures are described in detail in the literature, so that there is no need to comment further thereon. Reference is e.g. made to "Integralschaumstoffe", Piechota and Rohr, 1975; Kunststoff-Handbuch, vol. VII, "Polyurethane", 1966; "Schaumkunststoffe", published by the Fachverband Schaumkunststoffe in GKV, 1976; Wittfoht, "Kunststoff-Technisches Worterbuch", Part 3.

For the purpose of the easier and cleaner removal of the foam articles polymerized in the metal, wood or plastic moulds, the mould surfaces coming into contact with the foam-forming components or the polyurethane foam are treated with release agents (mould release agents) prior to filling the mould. For this purpose the mould surfaces are provided with a uniform release compound coating, to produce a release film thereon. This generally takes place by spraying or injecting, the release compound either being atomized by pressurizing the material itself or by e.g. the use of pressurized air. Apart from good mould release characteristics, in special cases the release agent must also be able to exert an influence upon the surface characteristics of the finished polyurethane foam article. Thus by the addition of certain additives, e.g. in the cold flexible foam field (seats, headrests, armrests, etc. in cars) the desired open-cell characteristics are produced along with the necessary "breathability" of the foam article.

Conventional release agents consist of organic solvents and release-active substances dissolved, dispersed, suspended or emulsified therein and which are referred to as solids. With regards to the disadvantages of such release compounds, particularly from the environmental standpoint and the long-lasting efforts to develop aqueous release agents, reference is e.g. made to European Patent Application No. 164501, European Patent Application No. 188219 and German Patent Application No. P 35 41 513. As can be gathered from the aforementioned applications, there is a considerable need for aqueous release compounds for use in processes for producing polyurethane foam articles where, apart from the desired good mould release characteristics, characteristics are also required with regards to release agent processability of the type known from conventional release agents based on organic solvents.

Objects of the present invention are therefore to provide aqueous release compounds of the aforementioned type, which have excellent mould removal characteristics, in use lead to polyurethane articles with good surface characteristics and as a function of the cycle times can be used at the temperatures required for obtaining adequately short venting times.

SUMMARY OF THE INVENTION

According to the invention the foregoing objects are achieved by an aqueous release agent of the aforementioned type, characterized in that it contains as a further release-active substance one or more aliphatic, primary, secondary and/or tertiary amines with at least one $C_{12}$–$C_{24}$ alkyl radical, in which the further alkyl radicals in the case of secondary and tertiary amines can be $C_1$–$C_{24}$ alkyl radicals, and contains as an emulsifier for the amine or amines one or more ammonium salts with the formula $[NR_1R_2R_3R_4]^+X^-$, in which $R_1$, $R_2$, $R_3$ and $R_4$, independently of one another, stand for hydrogen or $C_1$–$C_{24}$ alkyl radicals, provided that at least one of the radicals $R_1$, $R_2$, $R_3$ and $R_4$ is a $C_1$–$C_{24}$ alkyl radical and $X^-$ stands for an anion.

Preferred embodiments of the inventive release agents or compounds and their use will be readily apparent from the following description.

DETAILED DESCRIPTION

It has been surprisingly found that hydrophobic amines (so-called fatty amines) with at least one $C_{12}$–$C_{24}$ alkyl radical are release-active substances. It has hitherto only been known that amines are suitable as PU foam accelerators and stabilizers. The cation activity and marked substantivity of such amines was also known (cf. e.g. Hoechst brochure E. Hoe. 4200 "Fettamine und Folgeprodukte", pp. 6 and 7, to which reference should also be made with regards to the nomenclature of the fatty amines). It has been found that these characteristics are very helpful towards attaining the aforementioned objects. It has also been confirmed that these amines can be very well emulsified with ammonium salts and preferably with the ammonium salts corresponding to the amines as the emulsifier. Contrary to experience obtained with conventional emulsifiers, not only has the mould removability not been impaired, but frequently even improved. This is surprising because normally the release activity of a release compound is reduced by the addition of emulsifiers and can in certain cases be completely eliminated. In addition, the inventive combination of amine as the release-active substance and the corresponding ammonium salt as the emulsifier permits very simple production, in that the amine desired as the release-active substance is partly converted into the corresponding ammonium salt by adding a substoichiometric quantity of an acid. Since the acid is substoichiometric, some free amine is inherently left.

Suitable hydrophobic amines with a release activity are aliphatic primary, secondary and/or tertiary amines with at least one $C_{12}$ to $C_{24}$ alkyl radical. In the case of the secondary and tertiary amines, the second and third alkyl radical can be of a shorter chain in nature, so that apart from at least one $C_{12}$–$C_{24}$ alkyl radical, said amines can also have one or two $C_1$–$C_{24}$ alkyl radicals. Even though non-functional linear amines are preferred, functional amines like amine ethoxylates may also be used. Examples of suitable amines are cetyl, lauryl, tetradecyl, oleyl, stearyl, behenyl and eruca amine.

In practice often mixtures of amines, especially naturally occuring mixtures such as cocoamines are used, which are composed of the suitable amines according to this invention and especially the aforementioned amines. Preferred are particularly stearylamine, distearylamine, methyldistearylamine, oleylamine and tetradecylamine or the aforementioned mixtures of these compounds corresponding to the natural sources. Useful, too, are ethoxylates of the amines described herein, especially stearylamine ethoxylates, the degree of ethoxylation of which usually is in the range of 2 to 20. The amount of these release-active amines or amine derivatives in the inventive release compound is generally 0.05 to 10% by weight and preferably 1.0 to 5% by weight.

The emulsifier used is preferably the ammonium salt corresponding to the release-active amine, but it is also possible to use ammonium salts differing from the amine. Fundamentally suitable are ammonium salts with the general formula $[NR_1R_2R_3R_4]^+X^-$, in which $R_1$, $R_2$, $R_3$ and $R_4$, independently of one another, stand for hydrogen or $C_1-C_{24}$ alkyl radicals, provided that at least one of the radicals $R_1$, $R_2$, $R_3$ and $R_4$ is a $C_1-C_{24}$ alkyl radical and $X^-$ is a suitable anion readily chosen by the artisan. It is possible to use commercially available quaternary ammonium salts as well as ammonium salts formed during the reaction of the corresponding amines with hydrochloric, glycolic, citric, acetic, propionic or longer-chain $C_{12}-C_{24}$ fatty acids. Preferred emulsifiers are distearyldimethylammoniumchloride, trimethylstearylammoniumchloride, stearylammoniumchloride, methyldistearylammoniumchloride, cocoamineacetate as well as mixtures of these compounds. The quantity proportion of the ammonium salts in the release compounds of the present invention is generally 0.1 to 5% by weight and preferably 0.1 to 2.5% by weight. A special feature of the invention is that it is a so-called cationic emulsion, whereas hitherto only release compounds in the form of anionic emulsions were known.

A special advantage of the inventive release compound is the minimal formation of release compound residues (build-up) after mould removal.

The release agent according to the invention also contains as a release-active substance components known from the prior art. The release-active oil can therefore be selected from aliphatic or aromatic, natural or synthetic oils, whose amount in the release compound according to the invention is normally 1 to 25% and is preferably 10 to 20% by weight. The choice of any particular oil is not critical and is well within the skill of the artisan.

Instead of or in combination with oil, wax can be incorporated as a further release-active substance. It is once again possible to use the conventional saturated or unsaturated, natural or functional waxes, which are known as wax components for PU release compounds. Suitable examples are polyethylene, polypropylene, polybutine, polybutadiene and beeswax, as well as ester waxes and amide waxes with melting points of 30° to 145° C. The amount of such waxes in the inventive release compound is up to 10% by weight and preferably 2 to 8% by weight. Again, the choice of any particular wax, or combination of oil and wax, is not critical and well within the skill of the artisan.

Obviously the inventive release compound can contain further prior art components. Thus, apart from the ammonium salts used as the emulsifier, it is possible to use also known nonionic emulsifiers. The use of such components is known to those skilled in the art and is not essential to the invention.

The release agent application, i.e. the atomization of the release agent and the regulation of the spray mist, takes place according to the aforementioned, known spraying and injecting processes (cf. particularly European Patent Application No. 188219). The inventive release compound also causes no problems with regards to the application process and can be applied both by cold spraying and spraying of the material heated to 30° to 90° C. and preferably 40° to 70° C. There are no limitations with regards to the use of the airless, air mixed, low pressure airless or airless plus technology. Obviously the vaporizing behaviour of the water contained in the inventive release compound can be influenced by a suitable choice of temperature.

EXAMPLE

Four aqueous PU release agents in the form of emulsions are prepared in the conventional manner. The composition thereof is given in the following table.

|  | 1 | 2 | 3 | 4 |
|---|---|---|---|---|
| Oil | 9.0 | 19.2 | 19.2 | 18.0 |
| Soft wax | 1.0 | 0.8 | 0.8 | 1.0 |
| Conventional emulsifier | 1.0 | | | |
| Levelling agent | | 2.0 | 2.0 | 2.0 |
| Hydrochloric acid | | 0.16 | 0.15 | |
| Stearyl amine | | 3.8 | 1.9 | 1.5 |
| Methyldistearyl amine | | | 1.9 | 1.5 |
| Dimethyldistearyl ammonium-chloride | | | | 0.8 |
| Water | Remainder | Remainder | Remainder | Remainder |

*The amounts of the components in the table are given in percentages by weight.

The four aqueous release agents according to the above table were used in a conventional process for producing polyurethane foam articles. This revealed that release agent 1 did not lead to an adequate mould removal and also led to an unsatisfactory surface of the polyurethane foam article. However, release agent 2 gave very good mould removal characteristics and the polyurethane foam article produced with said release agent had a good surface. Release agents 3 and 4 also gave good mould removal characteristics and good surfaces of the PU foam articles produced.

Although the invention has been described in connection with preferred embodiments and ingredients, it is not so limited. Modifications within the scope of the following claims may be readily apparent to those skilled in the art.

We claim:

1. An aqueous release emulsion consisting essentially of:
    (a) an emulsified oil or wax;
    (b) an aliphatic primary, secondary or tertiary free amine having at least one $C_{12}-C_{24}$ alkyl radical in which in the case of secondary and tertiary amines and other radical or radicals are $C_1-C_{24}$ alkyl radicals;
    (c) an ammonium salt of the formula $(NR_1R_2R_3R_4)^+X^-$, wherein $R_1$, $R_2$, $R_3$ and $R_4$, independently, are H or $C_1$ to $C_{24}$-alkyl provided that at least one of $R_1$, $R_2$, $R_3$ and $R_4$ is $C_1$ to $C_{24}$ alkyl, and $X^-$ is an anion.

2. A release agent composition according to claim 1, wherein (b) comprises stearylamine, distearylamine, methyldistearylamine, oleylamine, or tetradecylamine.

3. A release agent composition according to claim 1, wherein (c) comprises an ammonium salt reaction product of an amine of component (b) and an acid.

4. A release agent composition according to claim 1 wherein (c) comprises distearyldimethylammoniumchloride, trimethylstearylammoniumchloride, stearylammoniumchloride, methyldistearylammoniumchloride or cocoamine acetate.

5. A release agent composition according to claim 2 wherein (c) comprises distearyldimethylammoniumchloride, trimethylstearylammoniumchloride, stearylammoniumchloride, methyldistearylammoniumchloride or cocoamine acetate.

6. A release agent composition according to claim 1 comprising 0.05 to 10% by weight of (b).

7. A release agent composition according to claim 1 comprising 0.1 to 5% by weight of (b).

8. A release agent according to claim 1 comprising 0.1 to 5 by weight of (c).

9. A release agent composition according to claim 1 comprising 0.1 to 2.5% by weight of (c).

10. A release agent composition according to claim 1 comprising 1 to 25% by weight of wax and up to 10% by weight of oil.

* * * * *